United States Patent
Spicer

(10) Patent No.: US 6,176,603 B1
(45) Date of Patent: Jan. 23, 2001

(54) WHEEL LIGHTING SYSTEM

(76) Inventor: Lester Spicer, 364 S. Oak St., Austin, IN (US) 47102

( * ) Notice: Under 35 U.S.C. 154(b), the term of this patent shall be extended for 0 days.

(21) Appl. No.: 09/288,137

(22) Filed: Apr. 8, 1999

(51) Int. Cl.$^7$ .................................................. F21V 7/04
(52) U.S. Cl. .......................... 362/500; 362/216; 362/263; 362/549; 362/223
(58) Field of Search .................................. 362/216, 223, 362/224, 225, 263, 500, 547

(56) References Cited

U.S. PATENT DOCUMENTS

| | | | |
|---|---|---|---|
| 4,430,692 | * | 2/1984 | Papadakis ............................. 362/500 |
| 4,775,919 | * | 10/1988 | Paersall et al. ...................... 362/500 |
| 5,121,305 | * | 6/1992 | Deed et al. ........................... 362/216 |
| 5,558,426 | * | 9/1996 | Cabanatan et al. .................. 362/500 |
| 5,634,707 | * | 6/1997 | Bailey, Jr. ............................. 362/500 |
| 6,045,244 | * | 4/2000 | Dixon et al. .......................... 362/500 |

* cited by examiner

*Primary Examiner*—Sandra O'Shea
*Assistant Examiner*—David V. Hobden

(57) ABSTRACT

A wheel lighting system for illuminating a wheel of a vehicle such as an automobile from behind the wheel. The wheel lighting system includes an annular light source and a tubular cover substantially covering the light source. The cover comprises a pair of separable arcuate tubular portions each having a pair of opposite ends and a longitudinal window extending therealong between the ends of the respective tubular portion. A plurality of mounting brackets each having a tubular mounting sleeve at a first end through which the cover is extended to connect the mounting brackets to the cover and light source and such that the longitudinal axes of the mounting brackets extend radially inwards from the cover.

13 Claims, 2 Drawing Sheets

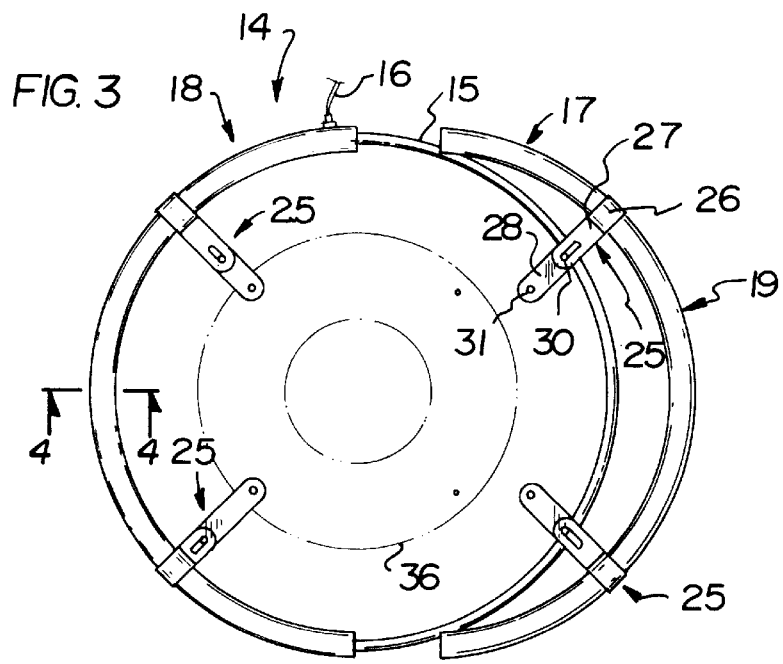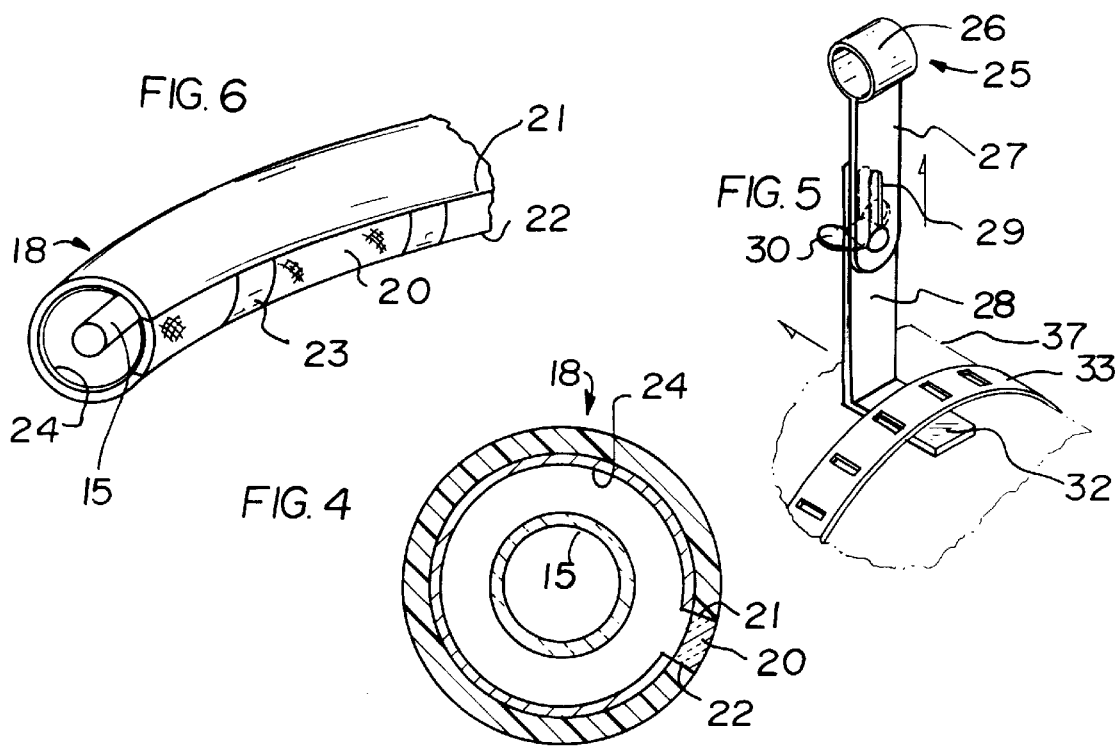

WHEEL LIGHTING SYSTEM

BACKGROUND OF THE INVENTION

1. Field of the Invention

The present invention relates to wheel lighting systems and more particularly pertains to a new wheel lighting system for illuminating a wheel of a vehicle such as an automobile from behind the wheel.

2. Description of the Prior Art

The use of wheel lighting systems is known in the prior art. More specifically, wheel lighting systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,016,144 by DiMaggio; U.S. Pat. No. 5,040,100 by Di Gaetano; U.S. Pat. No. 4,775,919 by Pearsall et al.; U.S. Pat. No. 4,782,431 by Park; U.S. Pat. No. 4,214,683 by Wills et al.; and U.S. Pat. No. Des. 332,441 by Douglas, Jr. which are all incorporated by reference herein.

While these devices fulfill their respective, particular objectives and requirements, the aforementioned patents do not disclose a new wheel lighting system. The inventive device includes an annular light source and a tubular cover substantially covering the light source. The cover comprises a pair of separable arcuate tubular portions each having a pair of opposite ends and a longitudinal window extending therealong between the ends of the respective tubular portion. A plurality of mounting brackets each having a tubular mounting sleeve at a first end through which the cover is extended to connect the mounting brackets to the cover and light source and such that the longitudinal axes of the mounting brackets extend radially inwards from the cover.

In these respects, the wheel lighting system according to the present invention substantially departs from the conventional concepts and designs of the prior art, and in so doing provides an apparatus primarily developed for the purpose of illuminating a wheel of a vehicle such as an automobile from behind the wheel.

SUMMARY OF THE INVENTION

In view of the foregoing disadvantages inherent in the known types of wheel lighting systems now present in the prior art, the present invention provides a new wheel lighting system construction wherein the same can be utilized for illuminating a wheel of a vehicle such as an automobile from behind the wheel.

The general purpose of the present invention, which will be described subsequently in greater detail, is to provide a new wheel lighting system apparatus and method which has many of the advantages of the wheel lighting systems mentioned heretofore and many novel features that result in a new wheel lighting system which is not anticipated, rendered obvious, suggested, or even implied by any of the prior art wheel lighting systems, either alone or in any combination thereof.

To attain this, the present invention generally comprises an annular light source and a tubular cover substantially covering the light source. The cover comprises a pair of separable arcuate tubular portions each having a pair of opposite ends and a longitudinal window extending therealong between the ends of the respective tubular portion. A plurality of mounting brackets each having a tubular mounting sleeve at a first end through which the cover is extended to connect the mounting brackets to the cover and light source and such that the longitudinal axes of the mounting brackets extend radially inwards from the cover.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wheel lighting system apparatus and method which has many of the advantages of the wheel lighting systems mentioned heretofore and many novel features that result in a new wheel lighting system which is not anticipated, rendered obvious, suggested, or even implied by any of the prior art wheel lighting systems, either alone or in any combination thereof.

It is another object of the present invention to provide a new wheel lighting system which may be easily and efficiently manufactured and marketed.

It is a further object of the present invention to provide a new wheel lighting system which is of a durable and reliable construction.

An even further object of the present invention is to provide a new wheel lighting system which is susceptible of a low cost of manufacture with regard to both materials and labor, and which accordingly is then susceptible of low prices of sale to the consuming public, thereby making such wheel lighting system economically available to the buying public.

Still yet another object of the present invention is to provide a new wheel lighting system which provides in the apparatuses and methods of the prior art some of the advantages thereof, while simultaneously overcoming some of the disadvantages normally associated therewith.

Still another object of the present invention is to provide a new wheel lighting system for illuminating a wheel of a vehicle such as an automobile from behind the wheel.

Yet another object of the present invention is to provide a new wheel lighting system which includes an annular light source and a tubular cover substantially covering the light source. The cover comprises a pair of separable arcuate tubular portions each having a pair of opposite ends and a longitudinal window extending therealong between the ends of the respective tubular portion. A plurality of mounting brackets each having a tubular mounting sleeve at a first end through which the cover is extended to connect the mounting brackets to the cover and light source and such that the longitudinal axes of the mounting brackets extend radially inwards from the cover.

Still yet another object of the present invention is to provide a new wheel lighting system that are stationary as the wheel rotates. On a front wheel, the system is mounted to a spindle behind the rotor, while on a rear wheel, the system is mounted directly to the rear axle.

Even still another object of the present invention is to provide a new wheel lighting system that has a clear portion with blackened out portions for giving the appearance of forward motion at slow speeds and reverse motion at fastener speeds.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic plan view taken from the vantage of line 3—3 of FIG. 2.

FIG. 4 is a schematic transverse cross sectional view taken from line 4—4 of FIG. 3.

FIG. 5 is a schematic perspective view of the mounting bracket for a rear wheel assembly.

FIG. 6 is a schematic partial perspective view of the present invention.

DESCRIPTION OF THE PREFERRED EMBODIMENT

Figure 1:
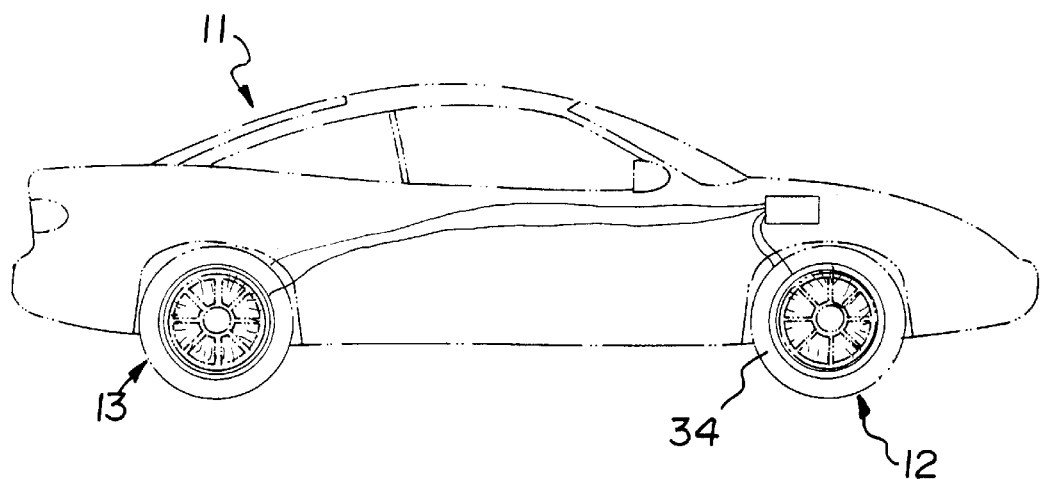
FIG. 1 is a schematic side view of a vehicle with a new wheel lighting system according to the present invention.
Figure 2:
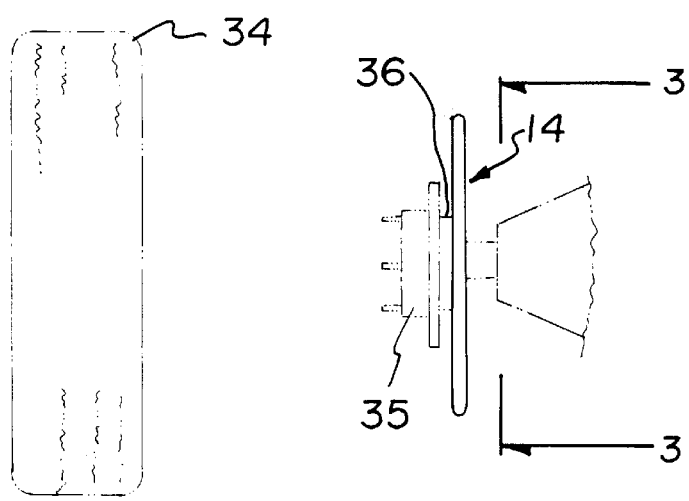
FIG. 2 is a schematic exploded side view of the present invention for a front wheel assembly.

With reference now to the drawings, and in particular to FIGS. 1 through 6 thereof, a new wheel lighting system embodying the principles and concepts of the present invention will be described.

As best illustrated in FIGS. 1 through 6, the wheel lighting system generally comprises an annular light source and a tubular cover substantially covering the light source. The cover comprises a pair of separable arcuate tubular portions each having a pair of opposite ends and a longitudinal window extending therealong between the ends of the respective tubular portion. A plurality of mounting brackets each having a tubular mounting sleeve at a first end through which the cover is extended to connect the mounting brackets to the cover and light source and such that the longitudinal axes of the mounting brackets extend radially inwards from the cover.

In use, the wheel lighting system is designed for a vehicle 11 having at least one front wheel assembly 12 and at least one rear wheel assembly 13. The front wheel assembly comprises a front wheel 34, a rotor 35 and a spindle 36 with the rotor interposed between the front wheel and the spindle. When the front wheel is rotated, the spindle is stationary with respect to the front wheel and does not rotate. The rear wheel assembly comprises a rear wheel and rear axle 37. The rear axle has a outer sleeve that is stationary when the rear wheel rotates.

The front and rear wheel assemblies each have a wheel light assembly 14 comprising an annular light source 15 having a generally circular transverse cross section taken substantially parallel to a radius of the light source. The light source preferably comprises a neon light source. The light source is connected to an electrical power supply of the vehicle by an electrical power cable 16.

A tubular cover 17 substantially covers the light source such that the light source is disposed in a lumen of the cover. As best illustrated in FIG. 4, the cover has a generally circular transverse cross section taken substantially parallel to a radius of the cover. The cover comprises a pair of separable generally semi-circular arcuate tubular portions 18,19 each having a pair of opposite ends, and an interior surface defining a lumen of the respective tubular portion. Each of the tubular portions has an inwardly facing longitudinal window 20 extending therealong between the ends of the respective tubular portion. The window of each tubular portion comprises a translucent (and ideally a transparent) material to permit passage therethrough of light from the light source. The window of each tubular portion preferably has a pair of substantially parallel sides 21,22 extending between the ends of the respective tubular portion.

The window of each tubular portion preferably has a plurality of substantially opaque generally rectangular segments 23 preferably spaced apart at generally equal intervals along the respective window between the ends of the associated tubular portion. The cover has inner and outer circumferences lying in a substantially common plane with one another. As best illustrated in FIGS. 4 and 6, the windows of the tubular portions lie in a plane extending at an acute angle to the common plane of the inner and outer circumferences of the cover. Ideally, the acute angle is about 30 degrees.

Preferably, the interior surface of each tubular portion has a shiny light reflecting coating 24 thereon for reflecting light from the light source towards the window of the respective tubular portion. The light reflecting coating is ideally substantially coextensive with the lumen tubular portion less the region of the window of the respective tubular portion.

With reference to FIGS. 3 and 5, a plurality of mounting brackets 25 are provided each having a pair of opposite ends and a longitudinal axis extending between the ends of the respective mounting bracket. Each of the mounting brackets has a generally cylindrical tubular mounting sleeve 26 at a first of the ends of the respective mounting bracket. The mounting sleeve of each mounting bracket has an axis extending generally perpendicular to the longitudinal axis of the respective mounting bracket. As illustrated in FIG. 3, the cover is extended through the mounting sleeves of the mounting bracket to connect the mounting brackets to the cover and light source and such that the longitudinal axes of the mounting brackets extend radially inwards from the cover.

Each of the mounting brackets is preferably adjustably extendable along the longitudinal axis of the respective mounting bracket. In a preferred embodiment, each of the mounting brackets has a pair of elongate portions 27,28 each having a longitudinal slot 29 therethrough. Each of the mounting brackets has a fastener 30 such as a threaded bolt and wing nut extending through the longitudinal slots of the elongate portions of the respective mounting bracket to slidably couple the elongate portions together to permit adjustable extension of the respective mounting bracket along the longitudinal axis of the respective mounting bracket.

With reference to FIG. 3, each of the mounting brackets of the wheel light assembly of the front wheel assembly has a mounting hole 31 therethrough adjacent a second of the ends of the respective mounting bracket. Each of the mounting brackets of the wheel light assembly of the front wheel assembly has a mounting fastener extended through the mounting hole of the respective mounting bracket into the spindle of the front wheel assembly to couple the second ends of the mounting brackets to the spindle such that the longitudinal axes of the mounting brackets outwardly radiate from the spindle and the cover and light source are positioned behind a back face of the front wheel.

With reference to FIG. 5, each of the mounting brackets of the wheel light assembly of the rear wheel assembly has a mounting flange 32 outwardly extending from a second of the ends of the respective mounting bracket substantially perpendicular to the longitudinal axis of the respective mounting bracket. The wheel light assembly of the rear wheel assembly further comprises an annular strap 33 disposed around the outer sleeve of the rear axle adjacent the rear wheel. As illustrated in FIG. 5, the mounting flanges of the mounting brackets are inserted between the strap and the rear axle such that the mounting brackets are coupled to the rear axle and radiate outwards from the rear axle such that the cover and light source are positioned behind a back face of the rear wheel.

In use, the wheel light assemblies are stationary with respect to their associated wheel when the wheel is rotated. In use, the light from the light source illuminates the back face of the associated wheel to give a glowing appearance to the wheel when viewed from a front face of the wheel. As the wheel is rotated when the vehicle is traversing a road surface, the light enhances the optical illusion of the wheel rotating forwards at slow speeds and backwards at higher speeds.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wheel lighting system for illuminating a wheel of a vehicle, comprising:
   an annular light source;
   a tubular cover substantially covering said light source;
   said cover comprising a pair of separable arcuate tubular portions, each of said tubular portions having a pair of opposite ends, and an interior surface defining a lumen of the respective tubular portion;
   each of said tubular portions having a longitudinal window extending therealong between said ends of the respective tubular portion;
   a plurality of mounting brackets each having a pair of opposite ends and a longitudinal axis extending between said ends of the respective mounting bracket;
   each of said mounting brackets having a generally cylindrical tubular mounting sleeve at a first of said ends of the respective mounting bracket;
   said cover being extended through said mounting sleeves of said mounting bracket to connect said mounting brackets to said cover and light source and such that said longitudinal axes of said mounting brackets extend radially inwards from said cover;
   wherein said window of each tubular portion comprises a translucent material to permit passage therethrough of light from said light source, said window of each tubular portion having a plurality of substantially opaque segments; and
   wherein said segments of each window are spaced apart at generally equal intervals along the respective window between said ends of the associated tubular portion.

2. The wheel lighting system of claim 1, wherein said light source comprises a neon light source.

3. The wheel lighting system of claim 1, wherein said window of each tubular portion faces radially inwards.

4. The wheel lighting system of claim 1, wherein each of said mounting brackets are adjustably extendable along said longitudinal axis of the respective mounting bracket.

5. The wheel lighting system of claim 4, wherein each of said mounting brackets has a pair of elongate portions, each of said elongate portions of each mounting bracket having a longitudinal slot therethrough, each of said mounting brackets having a fastener extending through said longitudinal slots of said elongate portions of the respective mounting bracket to slidably couple said elongate portions together to permit adjustable extension of the respective mounting bracket along the longitudinal axis of the respective mounting bracket.

6. The wheel lighting system of claim 1, wherein each of said mounting brackets has a mounting hole therethrough adjacent a second of said ends of the respective mounting bracket.

7. The wheel lighting system of claim 1, wherein each of said mounting brackets has a mounting flange outwardly extending from a second of said ends of the respective mounting bracket substantially perpendicular to said longitudinal axis of the respective mounting bracket.

8. A wheel lighting system, comprising:
   a vehicle having at least one front wheel assembly and at least one rear wheel assembly,
   said front wheel assembly comprising a front wheel, a rotor and a spindle, said rotor being interposed between said front wheel and said spindle, said rear wheel assembly comprising a rear wheel and rear axle;

said front and rear wheel assemblies each having a wheel light assembly comprising:

an annular light source having a generally circular transverse cross section taken substantially parallel to a radius of said light source, said light source comprising a neon light source, said light source being connected to an electrical power supply of said vehicle;

a tubular cover substantially covering said light source such that said light source is disposed in a lumen of said cover, said cover having a generally circular transverse cross section taken substantially parallel to a radius of said cover;

said cover comprising a pair of separable generally semi-circular arcuate tubular portions, each of said tubular portions having a pair of opposite ends, and an interior surface defining a lumen of the respective tubular portion;

each of said tubular portions having an inwardly facing longitudinal window extending therealong between said ends of the respective tubular portion, said window of each tubular portion comprising a translucent material to permit passage therethrough of light from said light source;

said window of each tubular portion having a pair of substantially parallel sides extending between said ends of the respective tubular portion;

said window of each tubular portion having a plurality of substantially opaque generally rectangular segments, said segments of each window being spaced apart at generally equal intervals along the respective window between said ends of the associated tubular portion;

said interior surface of each tubular portion having a light reflecting coating thereon;

a plurality of mounting brackets each having a pair of opposite ends and a longitudinal axis extending between said ends of the respective mounting bracket;

each of said mounting brackets having a generally cylindrical tubular mounting sleeve at a first of said ends of the respective mounting bracket, said mounting sleeve of each mounting bracket having an axis extending generally perpendicular to said longitudinal axis of the respective mounting bracket;

said cover being extended through said mounting sleeves of said mounting bracket to connect said mounting brackets to said cover and light source and such that said longitudinal axes of said mounting brackets extend radially inwards from said cover;

each of said mounting brackets being adjustably extendable along said longitudinal axis of the respective mounting bracket, each of said mounting brackets having a pair of elongate portions, each of said elongate portions of each mounting bracket having a longitudinal slot therethrough;

each of said mounting brackets having a fastener extending through said longitudinal slots of said elongate portions of the respective mounting bracket to slidably couple said elongate portions together to permit adjustable extension of the respective mounting bracket along the longitudinal axis of the respective mounting bracket;

each of said mounting brackets of said wheel light assembly of said front wheel assembly having a mounting hole therethrough adjacent a second of said ends of the respective mounting bracket;

each of said mounting brackets of said wheel light assembly of said front wheel assembly having a mounting fastener extended through said mounting hole of the respective mounting bracket into said spindle of said front wheel assembly to couple said second ends of said mounting brackets to said spindle such that said longitudinal axes of said mounting brackets outwardly radiate from said spindle;

each of said mounting brackets of said wheel light assembly of said rear wheel assembly having a mounting flange outwardly extending from a second of said ends of the respective mounting bracket substantially perpendicular to said longitudinal axis of the respective mounting bracket;

said wheel light assembly of said rear wheel assembly further comprising an annular strap disposed around said rear axle adjacent said rear wheel; and said mounting flanges of said mounting brackets being inserted between said strap and said rear axle such that said mounting brackets are coupled to said rear axle and radiate outwards from said rear axle.

9. A wheel lighting system for illuminating a wheel of a vehicle, comprising:

an annular light source;

a tubular cover substantially covering said light source;

said cover comprising a pair of separable arcuate tubular portions, each of said tubular portions having a pair of opposite ends, and an interior surface defining a lumen of the respective tubular portion;

each of said tubular portions having a longitudinal window extending therealong between said ends of the respective tubular portion;

a plurality of mounting brackets each having a pair of opposite ends and a longitudinal axis extending between said ends of the respective mounting bracket;

each of said mounting brackets having a generally cylindrical tubular mounting sleeve at a first of said ends of the respective mounting bracket;

said cover being extended through said mounting sleeves of said mounting bracket to connect said mounting brackets to said cover and light source and such that said longitudinal axes of said mounting brackets extend radially inwards from said cover;

wherein each of said mounting brackets are adjustably extendable along said longitudinal axis of the respective mounting bracket; and each of said mounting brackets having a pair of elongate portions, each of said elongate portions of each mounting bracket having a longitudinal slot therethrough, each of said mounting brackets having a fastener extending through said longitudinal slots of said elongate portions of the respective mounting bracket to slidably couple said elongate portions together to permit adjustable extension of the respective mounting bracket along the longitudinal axis of the respective mounting bracket.

10. The wheel lighting system of claim 9, wherein said light source comprises a neon light source.

11. The wheel lighting system of claim 9, wherein said window of each tubular portion faces radially inwards.

12. The wheel lighting system of claim 9, wherein each of said mounting brackets has a mounting hole therethrough adjacent a second of said ends of the respective mounting bracket.

13. The wheel lighting system of claim 9, wherein each of said mounting brackets has a mounting flange outwardly extending from a second of said ends of the respective mounting bracket substantially perpendicular to said longitudinal axis of the respective mounting bracket.

* * * * *